US011965256B2

United States Patent
Uchimoto et al.

(10) Patent No.: US 11,965,256 B2
(45) Date of Patent: Apr. 23, 2024

(54) ANODE FOR ALKALINE WATER ELECTROLYSIS AND METHOD FOR PRODUCING SAME

(71) Applicants: KYOTO UNIVERSITY, Kyoto (JP); NATIONAL UNIVERSITY CORPORATION YOKOHAMA NATIONAL UNIVERSITY, Yokohama (JP); DE NORA PERMELEC LTD, Fujisawa (JP)

(72) Inventors: Yoshiharu Uchimoto, Kyoto (JP); Tomoki Uchiyama, Kyoto (JP); Shigenori Mitsushima, Yokohama (JP); Yoshiyuki Kuroda, Yokohama (JP); Kensaku Nagasawa, Yokohama (JP); Yoshinori Nishiki, Fujisawa (JP); Awaludin Zaenal, Fujisawa (JP); Yun Bao, Fujisawa (JP)

(73) Assignees: KYOTO UNIVERSITY, Kyoto (JP); NATIONAL UNIVERSITY CORPORATION YOKOHAMA NATIONAL UNIVERSITY, Yokohama (JP); DE NORA PERMELEC LTD, Fujisawa (JP)

(*) Notice: Subject to any disclaimer, the term of this patent is extended or adjusted under 35 U.S.C. 154(b) by 0 days.

(21) Appl. No.: 18/248,848

(22) PCT Filed: Oct. 14, 2021

(86) PCT No.: PCT/JP2021/038116
  § 371 (c)(1),
  (2) Date: Apr. 12, 2023

(87) PCT Pub. No.: WO2022/080465
  PCT Pub. Date: Apr. 21, 2022

(65) Prior Publication Data
  US 2023/0323547 A1   Oct. 12, 2023

(30) Foreign Application Priority Data
  Oct. 15, 2020 (JP) ................. 2020-174095

(51) Int. Cl.
  *C25B 11/052* (2021.01)
  *C25B 1/04* (2021.01)
  (Continued)

(52) U.S. Cl.
  CPC .............. *C25B 11/052* (2021.01); *C25B 1/04* (2013.01); *C25B 11/061* (2021.01); *C25B 11/0771* (2021.01); *C25B 15/021* (2021.01)

(58) Field of Classification Search
  CPC ...................................................... C25B 1/04
  See application file for complete search history.

(56) References Cited

U.S. PATENT DOCUMENTS 2,928,783 A   3/1960   Bacon
4,101,716 A   7/1978   Horowitz et al.
(Continued)

FOREIGN PATENT DOCUMENTS

CN   110416559   11/2019
GB   864457   4/1961
(Continued)

OTHER PUBLICATIONS

Hu et al ("Oxygen-Release-Related Thermal Stability and Decomposition Pathways of LixNi0.5Mn1.5O4 Cathode Materials", Chem. Mater. 2014, 26, pp. 1108-1118) (Year: 2014).*
(Continued)

*Primary Examiner* — Alexander W Keeling
(74) *Attorney, Agent, or Firm* — Hamre, Schumann, Mueller & Larson, P.C.

(57) ABSTRACT

The present invention provides an alkaline water electrolysis anode such that even when electric power having a large
(Continued)

output fluctuation, such as renewable energy, is used as a power source, the electrolysis performance is unlikely to be deteriorated and excellent catalytic activity is retained stably over a long period of time. The alkaline water electrolysis anode is an alkaline water electrolysis anode 10 provided with an electrically conductive substrate 2 at least a surface of which contains nickel or a nickel base alloy and a catalyst layer 6 disposed on the surface of the electrically conductive substrate 2, the catalyst layer 6 containing a nickel-containing metal oxide having a spinel structure, wherein the nickel-containing metal oxide contains nickel (Ni) and manganese (Mn), and has an atom ratio of Li/Ni/Mn/O of (0.0 to 0.8)/(0.4 to 0.6)/(1.0 to 1.8)/4.0.

5 Claims, 6 Drawing Sheets

(51) Int. Cl.
  *C25B 11/061* (2021.01)
  *C25B 11/077* (2021.01)
  *C25B 15/021* (2021.01)

(56) References Cited

U.S. PATENT DOCUMENTS

| | | |
|---|---|---|
| 10,167,562 B2 | 1/2019 | Yagi et al. |
| 10,619,255 B2 | 4/2020 | Kato et al. |
| 10,676,832 B2 | 6/2020 | Mitsushima et al. |
| 2008/0230380 A1 | 9/2008 | Ohsaka et al. |
| 2015/0171455 A1 | 6/2015 | Mills |
| 2016/0237578 A1 | 8/2016 | Ichikawa et al. |
| 2017/0244132 A1 | 8/2017 | Wagner et al. |
| 2020/0040473 A1 | 2/2020 | Bick et al. |
| 2020/0407860 A1 | 12/2020 | Mitsushima et al. |

FOREIGN PATENT DOCUMENTS

| | | |
|---|---|---|
| IN | 0364/DEL/2001 | 5/2006 |
| JP | 8-106902 | 4/1996 |
| JP | 2015-086420 | 5/2015 |
| JP | 5869169 | 2/2016 |
| JP | 2016-221471 | 12/2016 |
| JP | 2017-190476 | 10/2017 |
| JP | 2017-538250 | 12/2017 |
| JP | 2018-081812 | 5/2018 |
| JP | 2018-178221 | 11/2018 |
| JP | 2020-515405 | 5/2020 |
| JP | 6975297 | 12/2021 |
| JP | 2022-039241 | 3/2022 |
| WO | 2018/047961 | 3/2018 |
| WO | 2019/172160 | 9/2019 |
| WO | 2020/032256 | 2/2020 |

OTHER PUBLICATIONS

Wei et al.("Facile synthesis of NiMn2O4 nanosheet arrays grown on nickel foam as novel electrode materials for high-performance supercapacitors", Ceramics International, 42, 2016, pp. 14963-14969) (Year: 2016).*
Hu et al ("Oxygen-Release-Related Thermal Stability and Decomposition Pathways of LixNi0.5Mn1.5O4 Cathode Materials", Chem. Mater. 2014, 26, 1108-11) (Year: 2014).*
Alagar et al (Synthesize of porous LiNi0.5Mn1.5O4 microcubes for lithium-ion battery and supercapacitor applications, J Mater Sci: Mater Electron (2018) 29:1173-1181) (Year: 2018).*
Kishida et al (Thermodynamic analysis using first-principles calculations of phases and structures of LixNi0.5Mn1.5O4 (0 ≤ x ≤ 1, Journal of Power Sources, vol. 241, Nov. 1, 2013, pp. 1-5) (Year: 2013).*
Miyazaki et al ("On the behavior of the selective oxidation by LiNiO2: Oxidative coupling of methane", Res. Chem. Intermed., vol. 28, No. 5, pp. 479-484 (2002)) (Year: 2002).*
International Search Report, issued in the corresponding PCT application No. PCT/JP2021/038116, dated Dec. 21, 2021, with English translation, 5 pages.
Gupta et al., "High-Rate Oxygen Evolution Reaction on AI-Doped LiNiO2", Advanced Materials, vol. 27, No. 39, pp. 6063-6067, 2015.
Zhu et al., "Layered Fe-Substituted LiNiO2 Electrocatalysts for High-Efficiency Oxygen Evolution Reaction", ACS Energy Letters, vol. 2, No. 7, pp. 1654-1660, 2017.
International Search Report, issued in the related PCT application No. PCT/JP2019/008289, dated Apr. 2, 2019, 5 pages (including translation).
Lu et al., "Electrochemical-Ellipsometric Studies of Oxide Film Formed on Nickel during Oxygen Evolution", J. Elelctrochem. Soc.: Electrochemical Science and Technology, vol. 125, No. 9, pp. 1416-1422, Sep. 1978, 7 pages.
Bowen et al., "Developments in Advanced Alkaline Water Electrolysis", Int. J. Hydrogen Energy, vol. 9, No. 1/2, pp. 59-66, 1984, 8 pages.
Mitsushima et al., "Present technologies and subjects of water electrolysis", Hydrogen Energy Systems, vol. 36, No. 1, pp. 11-16, 2011, 6 pages (English Abstract included).
Singh et al., "Electrocatalytic activity of metal-substituted Fe3O4 obtained at low temperature for O2 evolution", International Journal of Hydrogen Energy, vol. 24, pp. 433-439, 1999, 7 pages.
Nadesan et al., "Oxygen Evolution on Nickel Oxide Electrodes", J. Electrochem. Soc., vol. 132, No. 12, Dec. 1985, pp. 2957-2959, 3 pages.
Korean Office Action, issued in the related Korean application No. 10-2020-7028348, dated Oct. 20, 2020, 11 pages (including translation).
Fujita et al., "The Effect of LixNi2-xO2/Ni with Modification Method on Activity and Durability of Alkaline Water Electrolysis Anode", Electrocatalysis, No. 9, 2018, pp. 162-171.
Reimers et al., "Crystal structure of LixNi2-xO2 and a lattice-gas model for the order-disorder transition", Physical Review, vol. 46, No. 6, pp. 3236-3246, Aug. 1, 12 pages, 1992.
Kalyani et al., "Various aspects of LiNiO2 chemistry: A review", Science and Technology of Advanced Materials, vol. 6, pp. 689-703, 2005.
International Search Report, issued in the related PCT application No. PCT/JP2021/038117, dated Dec. 21, 2021, with English translation, 5 pages.
Menezes et al., "Using nickel manganese oxide catalysts forefficient water oxidation", ChemCommun, The Royal Society of Chemistry, vol. 51, pp. 5005-5008, 2015.
Korean Office Action, issued in the corresponding Korean patent application No. 10-2023-7014450, dated Jul. 8, 2023, 8 pages (with machine translation).
Thirupathi et al., "Nickel-doped Mn/TiO2 as an efficient catalyst for the low-temperature SCR of NO with NH3: Catalytic evaluation and characterizations", Journal of Catalysis, vo. 288, Apr. 2012, pp. 74-83.
Wu et al., "Perovskite oxide/carbon nanotube hybrid bifunctional electrocatalysts for overall water splitting", Electrochimica Acta, vol. 286, Oct. 1, 2018, pp. 47-54.
Restriction Requirement, issued in the U.S. Appl. No. 18/248,840, dated Dec. 22, 2023, 9 pages.
Meng et al., "Structure-property relationship of bifunctional MnO2 nanostructures: highly efficient, ultra-stable electrochemical water oxidation and oxygen reduction reaction catalysts identified in alkaline media", Journal of the American Chemical Society, vol. 136, pp. 11452-11464, 2014.
Office Action, issued in U.S. Appl. No. 18/248,840, dated Feb. 22, 2024, 11 pages.

* cited by examiner

[FIG.1]
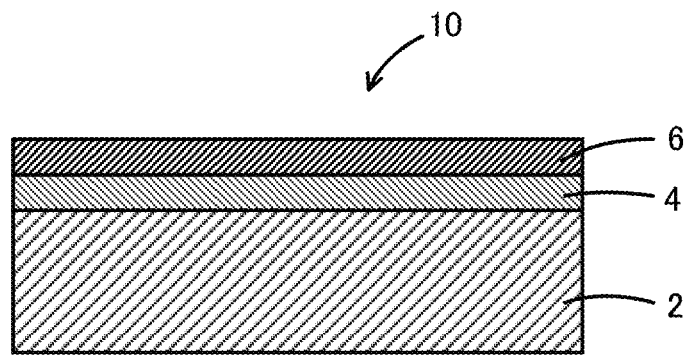
[FIG.2]
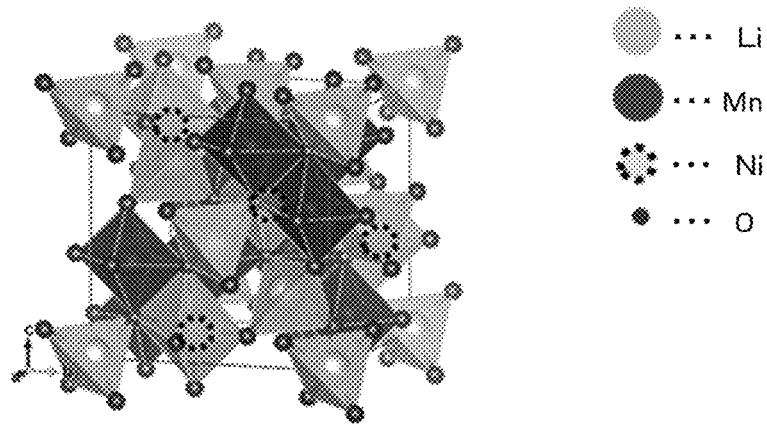
[FIG.3]
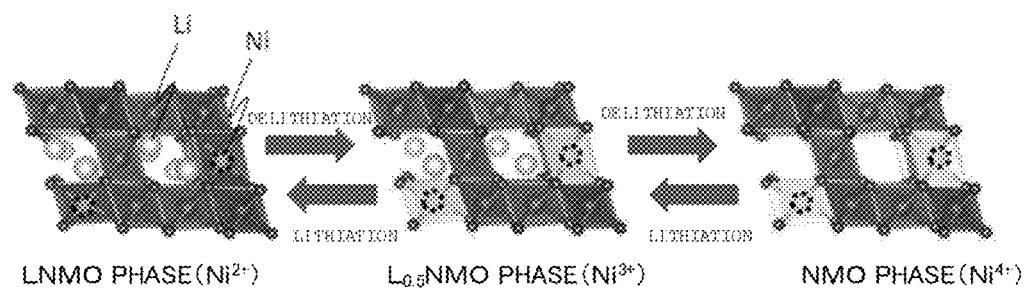

[FIG.4]
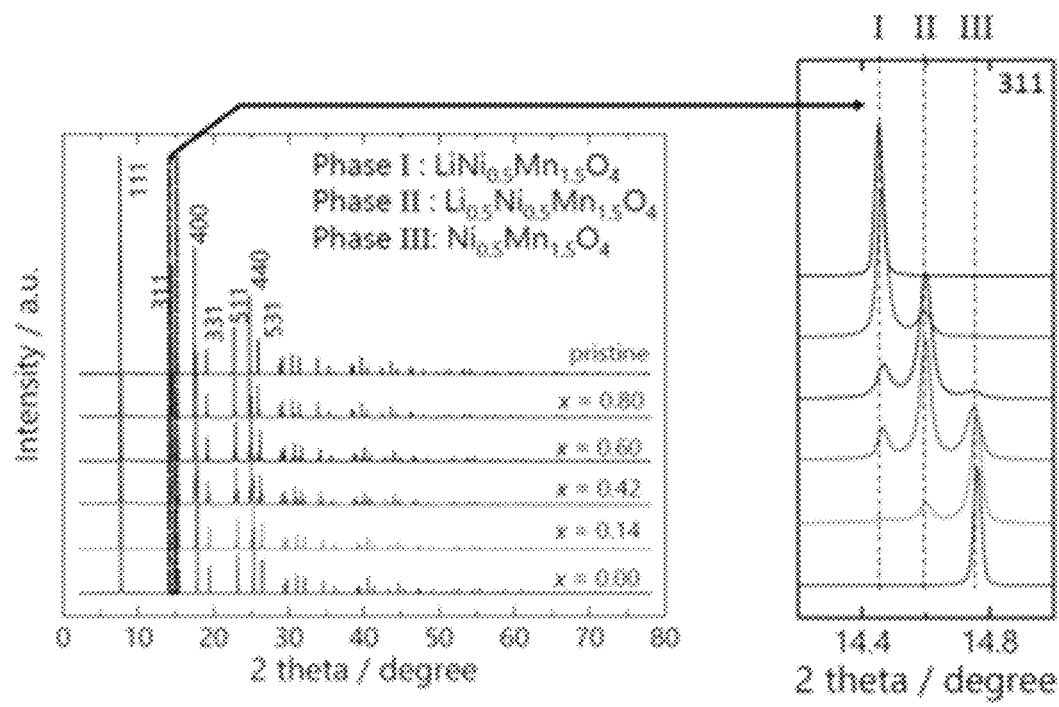

[FIG.5]
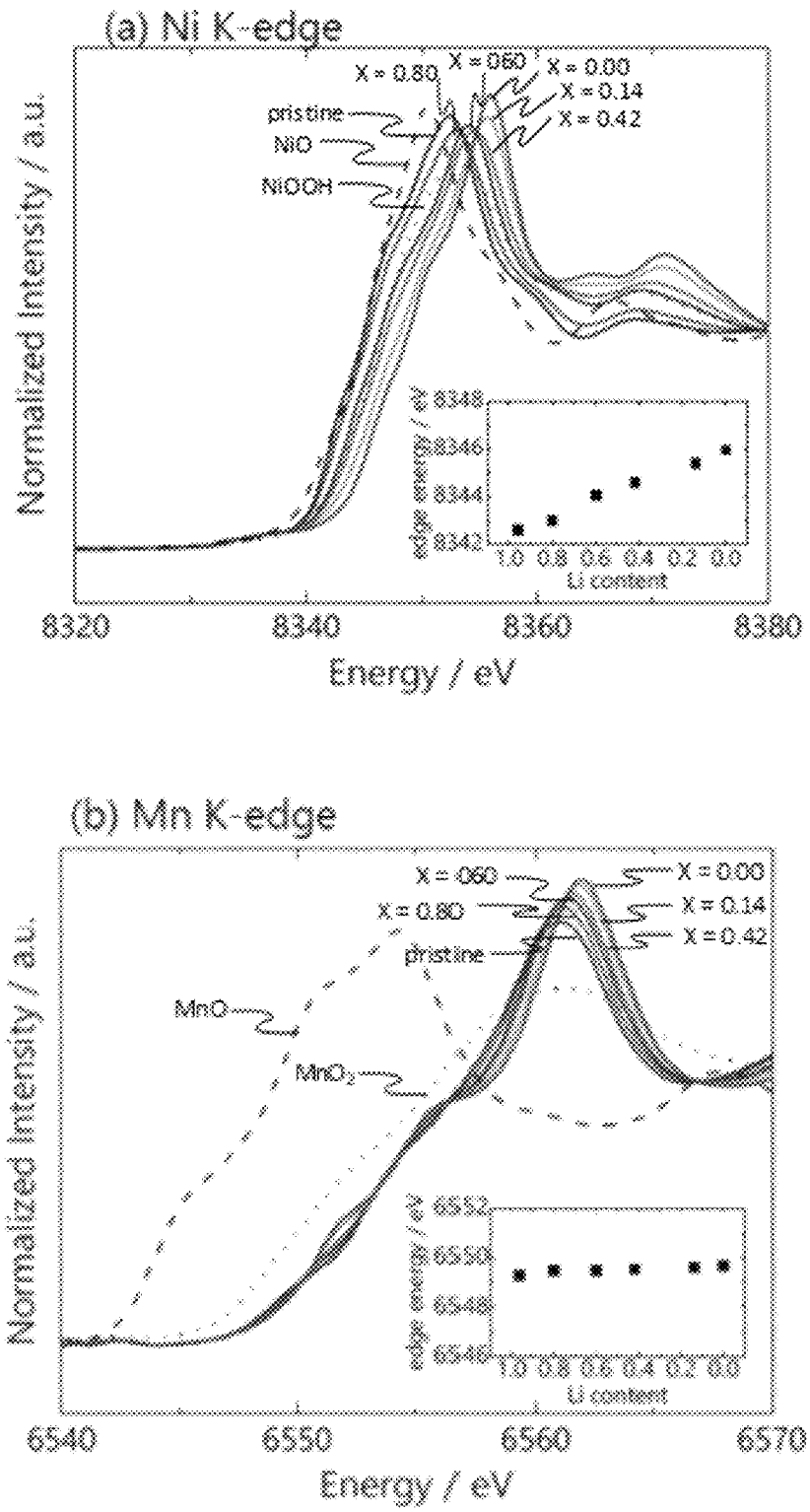

[FIG.6]
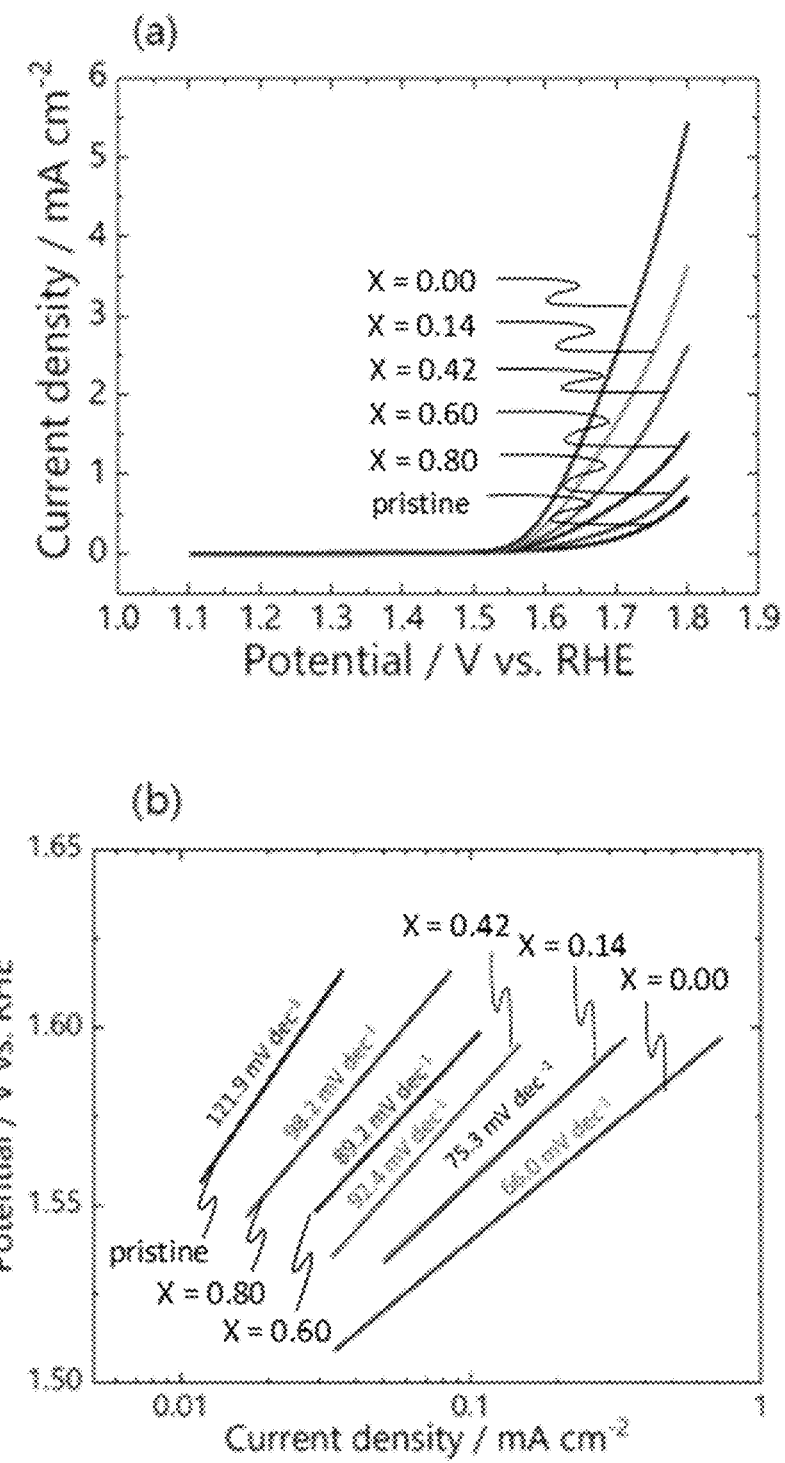

[FIG.7]
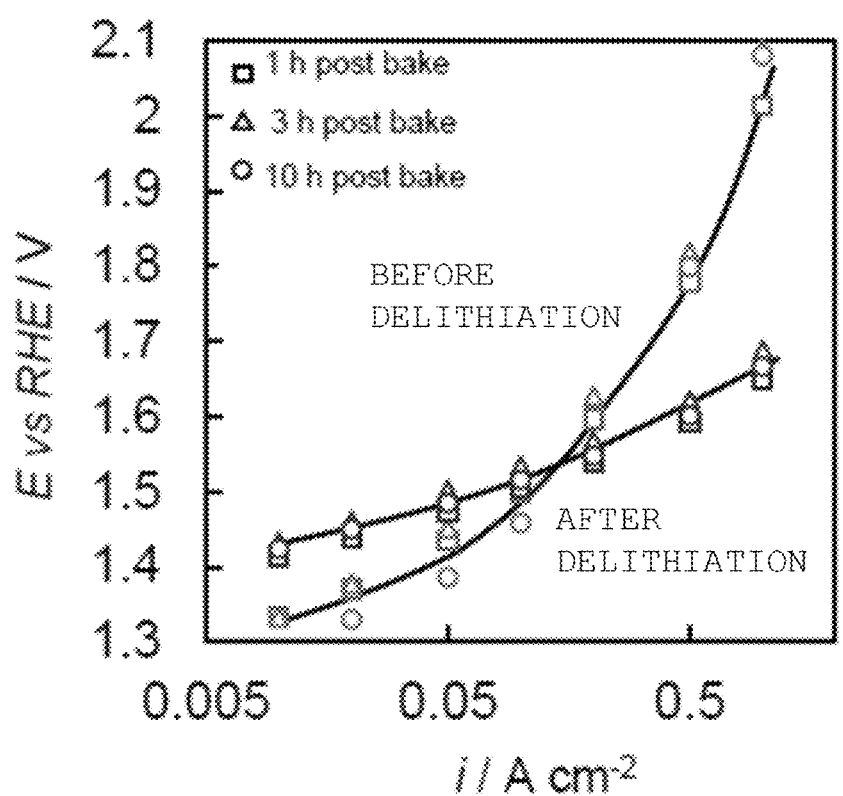

[FIG.8]
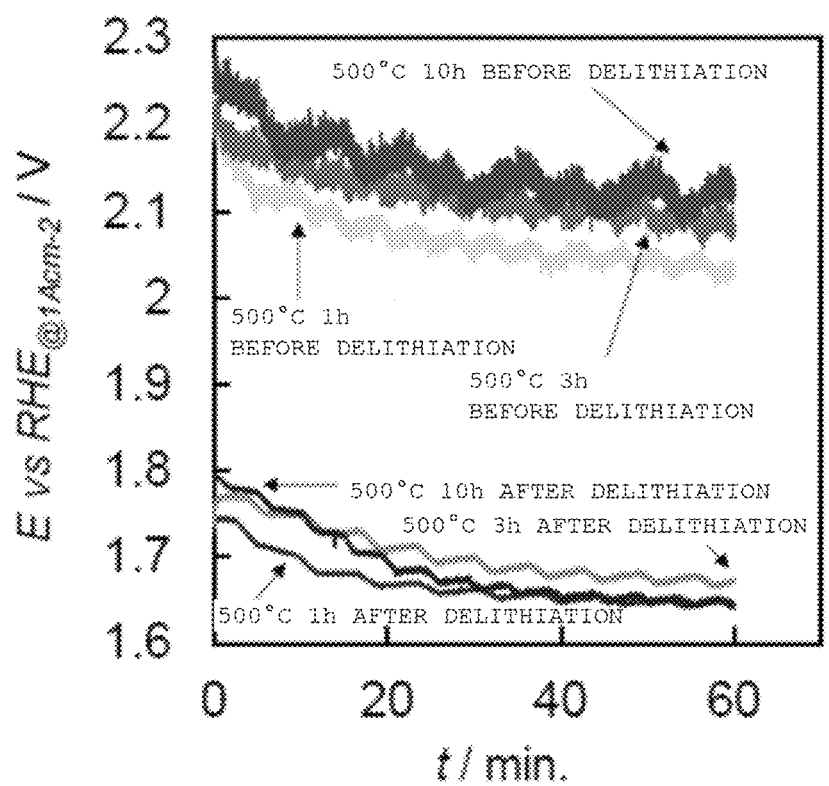

ANODE FOR ALKALINE WATER ELECTROLYSIS AND METHOD FOR PRODUCING SAME

TECHNICAL FIELD

The present invention relates to an alkaline water electrolysis anode and a method for producing the same.

BACKGROUND ART

Hydrogen is secondary energy which is suitable for storage and transportation and has small environmental load, and therefore a hydrogen energy system using hydrogen as an energy carrier has been attracting attention. Currently, hydrogen is mainly produced by steam reforming of fossil fuel, or the like. However, from the viewpoint of problems of global warming and exhaustion of fossil fuel, hydrogen production by water electrolysis using renewable energy, such as solar power generation and wind power generation, is important in generic technology. Water electrolysis is low cost, suitable for enlargement of scale, and therefore is a predominant technique for hydrogen production.

Among the elements which are used for water electrolysis, many of anode materials have an oxygen evolution overpotential of exceeding 0.3 V under actual operation conditions. It can be said that there is room for significant improvement in the oxygen evolution overpotential as compared to the fact that hydrogen evolution and chlorine evolution overpotentials utilized in current electrolysis industry are around 0.1 V. Note that when electric power having a large output fluctuation, such as renewable energy, is used as a power source for water electrolysis, an anode capable of stably retaining excellent catalytic activity over a long period of time is in the development stage and has not yet been put into practical use.

Current practical water electrolysis is largely divided into two. One is alkaline water electrolysis, in which a high-concentration alkali aqueous solution is used for an electrolyte. The other is solid polymer electrolyte water electrolysis, in which a solid polymer electrolyte (SPE) membrane is used for an electrolyte. When large-scale hydrogen production is performed by water electrolysis, it is said that alkaline water electrolysis, in which an inexpensive material, such as an iron group metal including nickel and the like, is used, is more suitable than solid polymer electrolyte water electrolysis, in which an electrode using a large amount of an expensive noble metal is used.

With respect to the high-concentration alkali aqueous solution, electric conductivity becomes high as the temperature increases, but corrosiveness also becomes high. Therefore, the upper limit of the operation temperature is controlled to about 80 to about 90° C. The electrolytic cell voltage has been improved to 2 V or less at a current density of 0.6 Acm$^{-2}$ by the development of constitutional materials and various piping materials for an electrolytic cell, which are high-temperature resistant and resistant to a high-concentration alkali aqueous solution, and the development of a low-resistivity separator and an electrode which has an enlarged surface area and has a catalyst applied thereon.

A nickel-based material which is stable in a high-concentration alkali aqueous solution is used as an alkaline water electrolysis anode, and it has been known that in the case of alkaline water electrolysis using a stable power source, a nickel-based anode has a life of several decades or longer. However, when renewable energy is used as a power source, severe conditions, such as sudden start/shutdown and abrupt load fluctuation, are frequent, and therefore deterioration in performance of the nickel-based anode has been problematic.

Both of the reaction of producing a nickel oxide and the reaction of reducing the produced nickel oxide progress on the surface of nickel-based material. Therefore, elimination of an electrode catalyst formed on the surface of nickel-based material is facilitated with the progress of these reactions. When the electric power for electrolysis is not supplied, the electrolysis stops, and the nickel-based anode is retained at a potential lower than the oxygen evolution potential (1.23 V vs. RHE) and higher than the potential of a hydrogen evolution cathode, which is a counter electrode, (0.00 V vs. RHE). In the electrolytic cell, electromotive force due to various chemical species is generated, so that the anode potential is retained low, and the reaction of reducing the nickel oxide is facilitated by the progress of a battery reaction.

A current generated by the battery reaction leaks through manifold in the case of, for example, an electrolytic stack obtained by combining a plurality of cells, such as an anode chamber and a cathode chamber. Examples of the countermeasure for preventing such leakage of a current include a method of allowing a minute current to flow continuously during shutdown. However, to allow a minute current to flow continuously during shutdown, special power source control is needed, and oxygen and hydrogen are generated at all times, and therefore there is a problem that excessive labor has to be done in terms of operation management. In addition, preventing a battery reaction by removing liquid immediately after shutdown for the purpose of intentionally avoiding a reverse current state is possible, but it cannot be said that such measure is always an adequate approach when operation with electric power having a large output fluctuation, such as renewable energy, is supposed.

In the past, platinum group metals, platinum group metal oxides, valve metal oxides, iron group oxides, lanthanide group metal oxides, and the like have been utilized as a catalyst for an oxygen evolution anode (anode catalyst) which is used for alkaline water electrolysis. As other anode catalysts, alloy-based anode catalysts using nickel as a base, such as Ni—Co and Ni—Fe; nickel having an enlarged surface area; electrically conductive oxides (ceramic materials) including spinel-based anode catalysts, such as $Co_3O_4$ and $NiCo_2O_4$, and perovskite-based anode catalysts, such as $LaCoO_3$ and $LaNiO_3$; noble metal oxides; oxides containing a lanthanide group metal and a noble metal; and the like have also been known.

In recent years, as the oxygen evolution anode which is used for high-concentration alkaline water electrolysis, an alkaline water electrolysis anode obtained by forming a lithium-containing nickel oxide catalyst layer containing lithium and nickel in a predetermined molar ratio on the surface of a nickel substrate (Patent Literature 1) and an alkaline water electrolysis anode obtained by forming a catalyst layer containing a nickel-cobalt-based oxide, and an iridium oxide or a ruthenium oxide on the surface of a nickel substrate (Patent Literature 2) have been proposed. Note that Patent Literature 3 discloses a method for producing defect-less $nLiNiMnO_4$ to be used as a cathode for a lithium ion battery.

In addition, it has been reported that $LiNi_{0.8}Al_{0.2}O_2$ having a layered rock salt type structure exhibits high oxygen evolution activity (Non-Patent Literature 1). It is presumed that Al plays a role of stabilizing the structure during polarization due to a synergistic effect with Ni. The layered rock salt structure has been developed by a thermal treatment in an oxygen gas. Attention is paid on $Al^{3+}$ doping because of stabilization of $Ni^{3+}$ in the $LiNiO_2$ layer and suppression of mixing of $Ni^{2+}$ in the $Li^+$ layer. Further, it has been reported that $LiNi_{0.8}Fe_{0.2}O_2$ having a layered rock salt type structure exhibits high oxygen evolution activity (Non-Patent Literature 2).

CITATION LIST

Patent Literature

Patent Literature 1: Japanese Patent Laid-Open No. 2015-86420
Patent Literature 2: Japanese Patent Laid-Open No. 2017-190476
Patent Literature 3: Indo Patent Application No. 0364DEL2001

Non-Patent Literature

Non-Patent Literature 1: Gupta, A.; Chemelewski, W. D.; Buddie Mullins, C.; Goodenough, Adv Mater., 2015, 27 (39), 6063-7.
Non-Patent Literature 2: Zhu, K.; Wu, T.; Zhu, Y.; Li, X.; Li, M.; Lu, R.; Wang, J.; Zhu, X.; Yang, W., ACS Energy Letters 2017, 2 (7), 1654-1660.

SUMMARY OF INVENTION

Technical Problem

However, there has been a problem that even in the alkaline water electrolysis anodes proposed in Patent Literatures 1 and 2, when electric power having a large output fluctuation, such as renewable energy, is used as a power source, the performance is likely to be lowered, making it difficult to use the anodes stably over a long period of time. In addition, it cannot necessarily be said that even $LiNi_{0.8}Al_{0.2}O_2$ reported in Non-Patent Literature 1 and $LiNi_{0.8}Fe_{0.2}O_2$ reported in Non-Patent Literature 2 are sufficiently highly active, and there has been still room for further improvement. Note that Patent Literature 3 describes nothing about utilization of produced $nLiMnO_4$ as an oxygen evolution anode for electrolyzing an alkali aqueous solution.

The present invention has been completed in view of such problems of the conventional techniques, and an object of the present invention is to provide an alkaline water electrolysis anode such that even when electric power having a large output fluctuation, such as renewable energy, is used as a power source, the electrolysis performance is unlikely to be deteriorated and excellent catalytic activity is retained stably over a long period of time. In addition, another object of the present invention is to provide a method for producing the alkaline water electrolysis anode.

Solution to Problem

As a result of diligent studies in order to solve the problems, the present inventors have found that by controlling the content of Li while retaining the stability of a $Mn^{4+}$-containing structure of a nickel-containing metal oxide having a spinel structure, reaction activation due to generation of $Ni^{4+}$ is brought about, and have completed the present invention.

That is, according to the present invention, an alkaline water electrolysis anode described below is provided.

[1] An alkaline water electrolysis anode provided with: an electrically conductive substrate at least a surface of which contains nickel or a nickel base alloy; and a catalyst layer disposed on the surface of the electrically conductive substrate, the catalyst layer containing a nickel-containing metal oxide having a spinel structure, wherein the nickel-containing metal oxide contains nickel (Ni) and manganese (Mn), and has an atom ratio of Li/Ni/Mn/O of (0.0 to 0.8)/(0.4 to 0.6)/(1.0 to 1.8)/4.0.
[2] The alkaline water electrolysis anode according to [1], wherein a proportion of manganese (Mn) having a valence of four in all the manganese (Mn) in the nickel-containing metal oxide is 99 mol % or more.
[3] The alkaline water electrolysis anode according to [1] or [2], further provided with an intermediate layer disposed between the electrically conductive substrate and the catalyst layer, the intermediate layer containing a lithium-containing nickel oxide represented by compositional formula $Li_xNi_{2-x}O_2$ wherein $0.02 \le x \le 0.5$.

Further, according to the present invention, a method for producing an alkaline water electrolysis anode, described below, is provided.

[4] A method for producing an alkaline water electrolysis anode, including: a step of subjecting a precursor containing a lithium component, a nickel component, and a manganese component to a thermal treatment to form a layer containing a lithium composite oxide on a surface of an electrically conductive substrate at least the surface of which contains nickel or a nickel base alloy; and a step of reacting nitronium tetrafluoroborate ($NO_2BF_4$) with the lithium composite oxide, thereby chemically performing delithiation, to form, on the surface of the electrically conductive substrate, a catalyst layer containing a nickel-containing metal oxide having a controlled lithium content and having a spinel structure, wherein the nickel-containing metal oxide contains nickel (Ni) and manganese (Mn), and has an atom ratio of Li/Ni/Mn/O of (0.0 to 0.8)/(0.4 to 0.6)/(1.0 to 1.8)/4.0.
[5] The method for producing an alkaline water electrolysis anode according to [4], wherein the precursor is subjected to a thermal treatment at 400 to 900° C. in an oxygen-containing atmosphere.
[6] The method for producing an alkaline water electrolysis anode according to [4] or [5], wherein the precursor is subjected to a thermal treatment in an oxygen-containing atmosphere having an oxygen partial pressure of 0.2 atm or higher.

Advantageous Effects of Invention

The present invention can provide an alkaline water electrolysis anode being such that even when electric power having a large output fluctuation, such as renewable energy, is used as a power source, the electrolysis performance is unlikely to be deteriorated, and excellent catalytic activity is retained stably over a long period of time. Further, the present invention can provide a method for producing the alkaline water electrolysis anode.

BRIEF DESCRIPTION OF DRAWINGS

FIG. 1 is a section view schematically showing one embodiment of an alkaline water electrolysis anode of the present invention.

FIG. 2 is a diagram schematically showing a crystal structure (space group: P4$_3$32) of nickel-containing metal oxides (catalysts).

FIG. 3 is a diagram schematically showing changes in valence of Ni accompanying delithiation and lithiation in a crystal structure of nickel-containing metal oxides (catalysts).

FIG. 4 is a graph showing synchrotron radiation X-ray diffraction patterns for nickel-containing metal oxides (catalysts).

FIG. 5(*a*) is a graph showing Ni K-edge XANES spectra for nickel-containing metal oxides (catalysts).

FIG. 5(*b*) is a graph showing Mn K-edge XANES spectra for nickel-containing metal oxides (catalysts).

FIG. 6(*a*) shows results of linear sweep voltammetry measurement (LSV curves).

FIG. 6(*b*) shows Tafel plots.

FIG. 7 is a graph showing comparison of current-potential curves for electrodes.

FIG. 8 is a graph showing comparison of changes in cell voltage with time for electrodes.

DESCRIPTION OF EMBODIMENTS

<Alkaline Water Electrolysis Anode>

FIG. 1 is a section view schematically showing one embodiment of an alkaline water electrolysis anode of the present invention. As shown in FIG. 1, an alkaline water electrolysis anode 10 of the present embodiment is provided with an electrically conductive substrate 2, an intermediate layer 4 formed on the surface of the electrically conductive substrate 2, and a catalyst layer 6 formed on the surface of the intermediate layer 4. Hereinafter, the details on the alkaline water electrolysis anode of the present invention (hereinafter, also simply referred to as "anode") will be described.

<Electrically Conductive Substrate>

The electrically conductive substrate 2 is an electric conductor that conducts electricity for electrolysis and is an element having a function as a carrier that carries the intermediate layer 4 and the catalyst layer 6. At least a surface of the electrically conductive substrate 2 (the surface on which the intermediate layer 4 and the catalyst layer 6 are formed) is formed with nickel or a nickel base alloy. That is, the whole of the electrically conductive substrate 2 may be formed with nickel or a nickel base alloy, or only the surface of the electrically conductive substrate 2 may be formed with nickel or a nickel base alloy. Specifically, the electrically conductive substrate 2 may be such that a coating of nickel or a nickel base alloy is formed on the surface of a metal material, such as iron, stainless steel, aluminum, or titanium, by plating or the like.

The thickness of the electrically conductive substrate is preferably 0.05 to 5 mm. The shape of the electrically conductive substrate is preferably a shape having an opening for removing bubbles of oxygen, hydrogen, and the like to be produced. For example, an expanded mesh or a porous expanded mesh can be used as the electrically conductive substrate. When the electrically conductive substrate has a shape having an opening, the aperture ratio of the electrically conductive substrate is preferably 10 to 95%.

(Intermediate Layer) The anode of the present invention is preferably provided with an intermediate layer disposed between the electrically conductive substrate and the catalyst layer. As shown in FIG. 1, the intermediate layer 4 is a layer formed on the surface of the electrically conductive substrate 2. The intermediate layer 4 suppresses corrosion or the like of the electrically conductive substrate 2 and fixes the catalyst layer 6 stably to the electrically conductive substrate 2. In addition, the intermediate layer 4 also serves as a role of supplying a current quickly to the catalyst layer 6. The intermediate layer 4 is preferably formed with a lithium-containing nickel oxide represented by composition formula Li$_x$Ni$_{2-x}$O$_2$ (0.02≤x≤0.5). When x in the compositional formula is less than 0.02, the electric conductivity is somewhat insufficient in some cases. On the other hand, when x exceeds 0.5, the physical strength and the chemical stability are somewhat lowered in some cases. The intermediate layer 4 formed with a lithium-containing nickel oxide represented by the compositional formula has enough electric conductivity for electrolysis, and exhibits excellent physical strength and chemical stability even after the use for a long period of time.

The thickness of the intermediate layer is preferably 0.01 μm or more and 100 μm or less, more preferably 0.1 μm or more and 10 μm or less. When the thickness of the intermediate layer is less than 0.01 μm, the above-described functions are not exhibited. On the other hand, even if the thickness of the intermediate layer is set in such a way as to exceed 100 μm, the above-described functions are unlikely to be exhibited because the voltage loss due to the resistance in the intermediate layer is large, and it is somewhat disadvantageous in terms of production costs or the like in some cases.

(Catalyst Layer)

The catalyst layer 6 is a layer that is formed on the surface of the intermediate layer 4 and has catalytic ability. By interposing the intermediate layer 4, the catalyst layer 6 is more firmly fixed on the electrically conductive substrate 2.

The catalyst layer is a layer containing a nickel-containing metal oxide having a spinel structure, and is preferably a layer substantially formed with a nickel-containing metal oxide having a spinel structure. Then, this nickel-containing metal oxide contains nickel (Ni) and manganese (Mn), and has an atom ratio of Li/Ni/Mn/O of (0.0 to 0.8)/(0.4 to 0.6)/(1.0 to 1.8)/4.0. When the catalyst layer containing a nickel-containing metal oxide having a composition in which the ratio of Li, Ni, Mn, and O is as described above is provided, thereby the electrolysis performance is unlikely to be deteriorated and excellent catalytic activity can be retained stably over a long period of time even when electric power having a large output fluctuation, such as renewable energy, is used as a power source.

The thickness of the catalyst layer is preferably 0.01 μm or more and 100 μm or less, more preferably 0.1 μm or more and 10 μm or less. When the thickness of the catalyst layer is less than 0.01 μm, the above-described functions are not exhibited. On the other hand, even if the thickness of the catalyst layer is set in such a way as to exceed 100 μm, the above-described functions are unlikely to be exhibited because the voltage loss due to the resistance in the catalyst layer is large, and it is somewhat disadvantageous in terms of production costs or the like in some cases.

<Method for Producing Alkaline Water Electrolysis Anode>

Next, a method for producing an alkaline water electrolysis anode of the present invention will be described. The method for producing an anode, which will be described below, is a method for suitably producing the above-described alkaline water electrolysis anode. The method for producing an anode of the present invention includes a nickel-containing metal oxide preparation step, and a catalyst layer formation step. The nickel-containing metal oxide preparation step is a step of reacting nitronium tetrafluoroborate ($NO_2BF_4$) with a lithium composite oxide formed by subjecting a precursor containing a lithium component, a nickel component, and a manganese component to a thermal treatment, thereby chemically performing delithiation to obtain a nickel-containing metal oxide having a controlled lithium content and having a spinel structure. In addition, the catalyst layer formation step is a step of forming a catalyst layer containing the nickel-containing metal oxide on the surface of the electrically conductive substrate.

Note that, if necessary, an intermediate layer can be disposed between the electrically conductive substrate and the catalyst layer, as described above. A method for producing an anode in which an intermediate layer is disposed further includes, prior to the above-described catalyst layer formation step, a step (coating step) of coating an aqueous solution containing a lithium ion and a nickel ion on the surface of the electrically conductive substrate, and a step (intermediate layer formation step) of subjecting the electrically conductive substrate on which the aqueous solution has been coated to a thermal treatment, thereby forming, on the surface of the electrically conductive substrate, an intermediate layer containing a lithium-containing nickel oxide represented by compositional formula $Li_xNi_{2-x}O_2$ wherein $0.02 \leq x \leq 0.5$.

(Pre-Treatment Step)

The electrically conductive substrate is preferably subjected to a chemical etching treatment in advance for the purpose of removing contamination particles of a metal, an organic substance, and the like on the surface before forming the intermediate layer and the catalyst layer. The consumption of the electrically conductive substrate by the chemical etching treatment is preferably set to about 30 $g/m^2$ or more and about 400 $g/m^2$ or less. In addition, the surface of the electrically conductive substrate is preferably subjected to a roughening treatment in advance for the purpose of enhancing the adhesiveness with the intermediate layer and the catalyst layer. Examples of the means for the roughening treatment include a blast treatment in which a powder is sprayed, an etching treatment using an acid that can dissolve the substrate, and plasma spraying.

(Coating Step)

In the coating step, an aqueous solution containing a lithium ion and a nickel ion is coated on the surface of the electrically conductive substrate. The intermediate layer is formed by a so-called thermal decomposition method. When the intermediate layer is formed by the thermal decomposition method, an aqueous solution of a precursor of the intermediate layer is first prepared. As the precursor containing a lithium component, a known precursor, such as lithium nitrate, lithium carbonate, lithium chloride, lithium hydroxide, and a lithium carboxylate, can be used. Examples of the lithium carboxylate include lithium formate and lithium acetate. As the precursor containing a nickel component, a known precursor, such as nickel nitrate, nickel carbonate, nickel chloride, and a nickel carboxylate, can be used. Examples of the nickel carboxylate include nickel formate and nickel acetate. It is particularly preferable to use at least one of a lithium carboxylate and a nickel carboxylate in particular as the precursor because thereby a dense intermediate layer can be formed even when calcination is performed at a low temperature, as will be described later.

(Intermediate Layer Formation Step)

In the intermediate layer formation step, the electrically conductive substrate on which the aqueous solution has been coated is subjected to a thermal treatment. Thereby, the intermediate layer containing a lithium-containing nickel oxide represented by compositional formula $Li_xNi_{2-x}O_2$ ($0.02 \leq x \leq 0.5$) can be formed on the surface of the electrically conductive substrate. The thermal treatment temperature at the time when the intermediate layer is formed by the thermal decomposition method can appropriately be set. When the decomposition temperature of the precursor and the production costs are taken into consideration, the thermal treatment temperature is preferably set to 450 to 600° C., more preferably 450 to 550° C. For example, the decomposition temperature of lithium nitrate is about 430° C., and the decomposition temperature of nickel acetate is about 373° C. When the thermal treatment temperature is set to 450° C. or higher, thereby each component can more surely be decomposed. When the thermal treatment temperature is set in such a way as to exceed 600° C., the oxidation of the electrically conductive substrate easily progresses, and the electrode resistance increases to bring about an increase in the voltage loss in some cases. The thermal treatment time may appropriately be set taking the reaction rate, the productivity, the oxidation resistance at the surface of the intermediate layer, and the like into consideration.

By appropriately setting the number of times of coating of the aqueous solution in the above-described coating step, the thickness of the intermediate layer to be formed can be controlled. Note that the coating and drying of the aqueous solution may be repeated for every layer until the uppermost layer is formed, and thereafter the thermal treatment may be performed on the whole layers, or the coating of the aqueous solution and the thermal treatment (pre-treatment) may be repeated for every layer until the uppermost layer is formed, and thereafter the thermal treatment may be performed on the whole layers. The temperature of the pre-treatment and the temperature of the thermal treatment on the whole layers may be the same or different. In addition, the time for the pre-treatment is preferably made shorter than the time for the thermal treatment on the whole layers.

(Nickel-Containing Metal Oxide Preparation Step)

In the nickel-containing metal oxide preparation step, a lithium composite oxide is first prepared by subjecting a precursor containing a lithium component, a nickel component, and a manganese component to a thermal treatment. As the lithium component, a known compound, such as lithium nitrate, lithium carbonate, lithium chloride, lithium hydroxide, and a lithium carboxylate, can be used. Examples of the lithium carboxylate include lithium formate and lithium acetate. As the nickel component, a known compound, such as nickel nitrate, nickel carbonate, nickel chloride, and a nickel carboxylate, can be used. Examples of the nickel carboxylate include nickel formate and nickel acetate. It is preferable to use at least one of a lithium carboxylate and a nickel carboxylate in particular because thereby a denser catalyst layer can be formed. As the manganese component, a known compound, such as manganese nitrate, manganese carbonate, manganese chloride, and a manganese carboxylate, can be used. Examples of the manganese carboxylate include manganese formate and manganese acetate.

For example, a lithium component, a nickel component, and a manganese component are added and dissolved at a predetermined ratio to an aqueous solution obtained by dissolving an excessive amount of citric acid in ultrapure water, and then the resultant solution is heated to around 300° C., and thereby the precursor can be obtained. Then, the obtained precursor is subjected to a thermal treatment in an oxygen-containing atmosphere for 2 to 50 hours at 400 to 900° C., preferably 700 to 900° C., and thereby the lithium composite oxide (hereinafter, also referred to as "LNMO") which is a target substance can be obtained.

The oxygen partial pressure in the oxygen-containing atmosphere at the time when the precursor is subjected to the thermal treatment is preferably set to 0.2 atm or higher, more preferably 0.5 atm or higher. In addition, the flow rate of the gas containing oxygen to be supplied is preferably controlled to 5 mL/min or less, more preferably 2.5 mL/min or less, in terms of oxygen. When the flow rate of the gas is excessively large (excessively fast), Li is likely to excessively volatilize and production of the oxide is excessively accelerated in some cases, and therefore the composition of LNMO is likely to deviate from the intended composition in some cases.

Delithiation can be chemically performed by reacting nitronium tetrafluoroborate ($NO_2BF_4$) with LNMO obtained. Thereby, a nickel-containing metal oxide having a controlled lithium content and having a spinel structure, the nickel-containing metal oxide containing nickel (Ni) and manganese (Mn) and having an atom ratio of Li/Ni/Mn/O of (0.0 to 0.8)/(0.4 to 0.6)/(1.0 to 1.8)/4.0, can be obtained.

By, for example, reacting LNMO and nitronium tetrafluoroborate ($NO_2BF_4$) in a solvent, such as acetonitrile, for 2 to 50 hours under a room temperature (25° C.) condition, lithium (Li) can be chemically eliminated from LNMO, and thereby the nickel-containing metal oxide, which is an intended catalyst, can be obtained. The lithium content in the nickel-containing metal oxide to be obtained can be controlled by appropriately setting the ratio between LNMO and nitronium tetrafluoroborate ($NO_2BF_4$). For example, the lithium content (atom ratio) in the nickel-containing metal oxide to be obtained is decreased from 0.96 to 0.00 as the amount of nitronium tetrafluoroborate ($NO_2BF_4$) to be reacted is increased. On the other hand, the nickel content and manganese content in the nickel-containing metal oxide to be obtained are almost the same as the nickel content and manganese content in LNMO and are not substantially changed.

Besides nitronium tetrafluoroborate ($NO_2BF_4$), by reacting a component, such as, for example, a bromine ($Br_2$) gas, nitronium hexafluorophosphate ($NO_2PF_6$), and nitrosonium hexafluorophosphate ($NOPF_6$), lithium (Li) can also be chemically eliminated from LNMO, and thereby the nickel-containing metal oxide, which is an intended catalyst, can be obtained. However, from the viewpoint of reactivity and the like, it is particularly preferable to use nitronium tetrafluoroborate ($NO_2BF_4$).

The obtained nickel-containing metal oxide can be stored after being washed and dried using a vacuum oven or the like. The nickel-containing metal oxide can usually be obtained in granular form. The particle size of the nickel-containing metal oxide is, for example, about 0.1 to about 10 μm. Whether or not the obtained nickel-containing metal oxide has a spinel structure can be ascertained by crystal structure analysis using XRD.

(Catalyst Layer Formation Step)

In the catalyst layer formation step, the catalyst layer containing a nickel-containing metal oxide, which is a catalyst, is formed on the surface of the electrically conductive substrate. Thereby, the intended alkaline water electrolysis anode can be obtained. To form the catalyst layer on the surface of the electrically conductive substrate, a conventionally known method may appropriately be adopted, and the method is not particularly limited. For example, a catalyst ink is prepared by adding a catalyst (nickel-containing metal oxide) to a solvent containing a particular resin (Nafion®) or the like. Then, the prepared catalyst ink is coated on the surface of the electrically conductive substrate or the surface of the intermediate layer formed on the electrically conductive substrate, and, if necessary, dried by heating or the like, and thereby the catalyst layer can be formed on the surface of the electrically conductive substrate.

(Lithium Composite Oxide-Containing Layer Formation Step)

In addition, the alkaline water electrolysis anode of the present invention can also be produced suitably by the method described below. That is, the method for producing an anode of the present invention includes a lithium composite oxide-containing layer formation step and a catalyst layer formation step. The lithium composite oxide-containing layer formation step is a step of subjecting a precursor containing a lithium component, a nickel component, and a manganese component to a thermal treatment to form a layer containing a lithium composite oxide on the surface of an electrically conductive substrate at least the surface of which contains nickel or a nickel base alloy. Further, the catalyst layer formation step is a step of reacting nitronium tetrafluoroborate ($NO_2BF_4$) with the lithium composite oxide, thereby chemically performing delithiation, to form, on the surface of the electrically conductive substrate, a catalyst layer containing a nickel-containing metal oxide which has a controlled lithium content and has a spinel structure.

For example, in the lithium composite oxide-containing layer formation step, an aqueous solution of a precursor containing the above-described precursor containing a lithium component, a nickel component, and a manganese component is coated on the surface of the electrically conductive substrate. Then, the electrically conductive substrate the surface of which has been coated with the aqueous solution of the precursor is subjected to a thermal treatment. Thereby, the precursor can be subjected to the thermal treatment, and thus the lithium composite oxide-containing layer can be formed on the surface of the electrically conductive substrate. That is, the lithium composite oxide-containing layer is formed by a so-called thermal decomposition method.

For example, a lithium component, a nickel component, and a manganese component are added and dissolved at a predetermined ratio to an aqueous solution obtained by dissolving an excessive amount of citric acid in ultrapure water, and thereby the aqueous solution of the precursor can be prepared. The prepared aqueous solution of the precursor is coated on the surface of the electrically conductive substrate and heated to around 300° C., and thereby the precursor is formed. Then, the formed precursor is subjected to a thermal treatment in an oxygen-containing atmosphere for 2 to 50 hours at 400 to 900° C., preferably 700 to 900° C., and thereby a lithium composite oxide (LNMO) which is a target substance can be produced, and thus the lithium composite oxide-containing layer can be formed on the surface of the electrically conductive substrate.

The oxygen partial pressure in the oxygen-containing atmosphere at the time when the precursor is subjected to the thermal treatment is preferably set to 0.2 atm or higher, more preferably 0.5 atm or higher. In addition, the flow rate of the gas containing oxygen to be supplied is preferably controlled to 5 mL/min or less, more preferably 2.5 mL/min, in terms of oxygen. When the flow rate of the gas is excessively large (excessively fast), Li is likely to excessively volatilize and production of the oxide is excessively accelerated in some cases, and therefore the composition of LNMO is likely to deviate from the intended composition in some cases.

(Catalyst Layer Formation Step)

In the catalyst layer formation step, delithiation is chemically performed by reacting nitronium tetrafluoroborate ($NO_2BF_4$) with LNMO contained in the formed lithium composite oxide-containing layer. Thereby, a nickel-containing metal oxide having a controlled lithium content and having a spinel structure, the nickel-containing metal oxide containing nickel (Ni) and manganese (Mn) and having an atom ratio of Li/Ni/Mn/O of (0.0 to 0.8)/(0.4 to 0.6)/(1.0 to 1.8)/4.0, is produced, and thus the catalyst layer containing this nickel-containing metal oxide can be formed on the surface of the electrically conductive substrate.

By, for example, immersing, in a solvent, such as acetonitrile, the electrically conductive substrate which has a lithium composite oxide-containing layer formed on the surface thereof and reacting nitronium tetrafluoroborate ($NO_2BF_4$) for 2 to 50 hours under a room temperature (25° C.) condition, lithium (Li) can be chemically eliminated from LNMO, and thereby the nickel-containing metal oxide, which is an intended catalyst, can be formed. The lithium content in the nickel-containing metal oxide to be obtained can be controlled by appropriately setting the ratio between LNMO and nitronium tetrafluoroborate ($NO_2BF_4$). For example, the lithium content (atom ratio) in the nickel-containing metal oxide to be obtained is decreased from 0.96 to 0.00 as the amount of nitronium tetrafluoroborate ($NO_2BF_4$) to be reacted is increased. On the other hand, the nickel content and manganese content in the nickel-containing metal oxide to be formed are almost the same as the nickel content and manganese content in LNMO and are not substantially changed. Whether or not the formed nickel-containing metal oxide has a spinel structure can be ascertained by crystal structure analysis using XRD.

<Use of Alkaline Water Electrolysis Anode>

The alkaline water electrolysis anode of the present invention can be used as an oxygen evolution anode at the time when alkaline water is electrolyzed. That is, use of the anode of the present invention can form an electrolytic cell, such as an alkaline water electrolytic cell. The types, constitution, and the like of the cathode and separator to be used together with the above-described anode are not particularly limited, and a cathode and a separator which are used in conventional alkaline water electrolysis can be used.

(Cathode)

As the cathode, a substrate made of a material that is bearable to alkaline water electrolysis and a catalyst having a small cathode overpotential are preferably selected and used. As the cathode substrate, a nickel substrate, or a cathode substrate obtained by forming an active cathode by coating the nickel substrate can be used. Examples of the shape of the cathode substrate include an expanded mesh and a porous expanded mesh in addition to a plate shape.

The cathode material includes porous nickel having a large surface area, a Ni—Mo-based material, and the like. Besides, the cathode material includes Raney nickel-based materials, such as Ni—Al, Ni—Zn, and Ni—Co—Zn; sulfide-based materials, such as Ni—S; and hydrogen absorbing alloy-based materials, such as $Ti_2Ni$; and the like. The catalyst preferably has characteristics of low hydrogen overpotential, high stability against short-circuit, high poisoning resistance, and the like. As other catalysts, metals, such as platinum, palladium, ruthenium, and iridium, and oxides thereof are preferable.

(Separator)

As the electrolysis separator, asbestos, non-woven fabric, an ion-exchange membrane, a porous polymer membrane, and a composite membrane of an inorganic substance and an organic polymer, and the like can be used. Specifically, an ion-permeable separator such that organic fiber cloth is incorporated in a mixture of a hydrophilic inorganic material, such as a calcium phosphate compound and calcium fluoride, and an organic binding material, such as polysulfone, polypropylene, and polyvinylidene fluoride, can be used. In addition, an ion-permeable separator such that stretched organic fiber cloth is incorporated in a film-forming mixture of an inorganic hydrophilic substance in the form of particles, such as oxides and hydroxides of antimony and zirconium, and an organic binder, such as a fluorocarbon polymer, polysulfone, polypropylene, polyvinyl chloride, and polyvinyl butyral, can be used.

By using an alkaline water electrolytic cell using the anode of the present invention as a constitutional element, a high-concentration alkali aqueous solution can be electrolyzed. The alkali aqueous solution that is used as the electrolyte is preferably an aqueous solution of an alkaline metal hydroxide, such as potassium hydroxide (KOH) or sodium hydroxide (NaOH). The concentration of the alkali aqueous solution is preferably 1.5% by mass or more and 40% by mass or less. In addition, the concentration of the alkali aqueous solution is preferably 15% by mass or more and 40% by mass or less because the electric conductivity is large, and the electric power consumption can be suppressed. Further, when the costs, the corrosiveness, the viscosity, the operability, and the like are taken into consideration, the concentration of the alkali aqueous solution is preferably 20% by mass or more and 30% by mass or less.

EXAMPLES

Hereinafter, the present invention will specifically be described based on Examples, but the present invention is not limited to these Examples. Note that "parts" and "%" in Examples and Comparative Examples are each on a mass basis unless otherwise noticed.

<Production of Alkaline Water Electrolysis Catalyst>

Production Example 1

Stoichiometric amounts of $LiNO_3$, $Ni(NO_3)_2 \cdot 6H_2O$, and $Mn(NO_3)_2 \cdot 6H_2O$ were dissolved in ultrapure water. Citric anhydride in a four-fold molar excessive amount was added to the solution under stirring, and then the resultant mixture was heated to 300° C. to obtain a precursor in the form of a powder. The obtained precursor was calcined at 800° C. for 12 hours and then further calcined at 700° C. for 48 hours to obtain a target substance (LNMO) in the form of a powder. A solution obtained by dissolving part of the obtained standard substance in an acid was used as a sample, and the composition was analyzed by inductively coupled plasma (ICP) emission spectroscopy. As an inductively coupled plasma emission spectrometer, "ICPS-8100CL," product name, (manufactured by SHIMADZU CORPORATION) was used. As a result, it was ascertained that the chemical composition of the obtained target substance (LNMO) is represented by "$Li_{0.96}Ni_{0.49}Mn_{1.51}O_4$."

The obtained target substance (LNMO) and nitronium tetrafluoroborate ($NO_2BF_4$) were added to acetonitrile according to the ratio of amounts (molar ratio) in conditions 1 to 5 shown in Table 1 and reacted at room temperature for 48 hours. The suspension after the reaction was subjected to filtration, and a product was then washed with acetonitrile three times and dried overnight using a vacuum oven, and thus catalysts (nickel-containing metal oxides) each having a chemical composition shown in Table 1 were obtained.

Note that the chemical compositions of the obtained catalysts (nickel-containing metal oxides) were identified by inductive coupled plasma (ICP) emission spectroscopy.

TABLE 1

| | LNMO:NO$_2$BF$_4$ (molar ratio) | Chemical composition |
|---|---|---|
| Untreated | 1:0.00 | Li$_{0.96}$Ni$_{0.49}$Mn$_{1.51}$O$_4$ |
| Condition 1 | 1:0.73 | Li$_{0.80}$Ni$_{0.50}$Mn$_{1.50}$O$_4$ |
| Condition 2 | 1:0.92 | Li$_{0.60}$Ni$_{0.49}$Mn$_{1.51}$O$_4$ |
| Condition 3 | 1:1.24 | Li$_{0.42}$Ni$_{0.49}$Mn$_{1.51}$O$_4$ |
| Condition 4 | 1:2.29 | Li$_{0.14}$Ni$_{0.50}$Mn$_{1.50}$O$_4$ |
| Condition 5 | 1:10.1 | Li$_{0.00}$Ni$_{0.49}$Mn$_{1.51}$O$_4$ |

FIG. 2 is a diagram schematically showing the crystal structure (space group: P4$_3$32) of the nickel-containing metal oxides (catalysts). In addition, FIG. 3 is a diagram schematically showing changes in valence of Ni accompanying delithiation and lithiation the crystal structure of the nickel-containing metal oxides (catalysts). As shown in FIGS. 2 and 3, by reacting the lithium composite oxide with nitronium tetrafluoroborate (NO$_2$BF$_4$), only the valence of Ni can be systematically changed while the crystal structure and the valence (4$^+$) of 99 mol % or more of Mn are retained. Therefore, it is possible to systematically control the electronic structure, and the relationship between the change in the electronic state and oxygen evolution activity of Ni can be directly considered. Note that the proportion of manganese (Mn) having a valence of four in all the manganese (Mn) in the nickel-containing metal oxide can be measured by, for example, X-ray absorption spectroscopy.

FIG. 4 is a graph showing synchrotron radiation X-ray diffraction patterns for the nickel-containing metal oxides (catalysts). As shown in FIG. 4, all the peaks were indexed to the tertiary phase and space group P4$_3$32, and no impurities were observed. Note that TEM images showed that the structures were retained even after delithiation. In addition, the average particle sizes of the nickel-containing metal oxides (catalysts), measured from SEM images, were about 1.5 μm.

FIG. 5($a$) is a graph showing Ni K-edge XANES spectra for the nickel-containing metal oxides (catalysts) and FIG. 5($b$) is a graph showing Mn K-edge XANES spectra for the nickel-containing metal oxides (catalysts). FIG. 5 shows that the electronic state of Mn remained almost unchanged while the electronic state of Ni was changed remarkably. The Ni K-edge XANES spectra (FIG. 5($a$)) showed a monotonic edge shift to higher energy, indicating that the average oxidation state of Ni changed from Ni$^{2+}$ in LiNi$_{0.5}$Mn$_{1.5}$O$_4$ to Ni$^{4+}$ in Ni$_{0.5}$Mn$_{1.5}$O$_4$. In addition, the Mn K-edge spectra (FIG. 5($b$)) changed slightly, but it was ascertained that the state of Mn$^{4+}$ was retained. From those described above, it can be seen that the chemical oxidation using NO$_2$BF$_4$ can control the electronic structure of Ni without changing the electronic structure of Mn.

Each catalyst ink was prepared by mixing 4 mg of the catalyst, 998 μL of acetonitrile, and 2 μL of a 5% Nafion® solution, and sonicating the resultant mixture for 220 minutes in an ice bath. On a polished glassy carbon (GC) rotating disk electrode (RDE, manufactured by HOKUTO DENKO CORPORATION, diameter 5 mm, 0.196 cm$^2$), 24.5 μL of the catalyst ink was dropped for coating. Then, electrolysis operation was performed using the following three-electrode cell connected to a potentiogalvanostat (trade name "MPG-205-NUC," manufactured by Bio-Logic Science Instruments SAS). Note that linear sweep voltammetry (LSV) was performed as a pre-treatment, and a current was measured at a potential of 1.1 to 1.8 V and a sweep rate of 5 mV/s while the electrode was rotated at 1,600 rpm. Note that all the electrochemical experiments were conducted in a nitrogen atmosphere. FIG. 6($a$) shows results of the linear sweep voltammetry measurement (LSV curves) and FIG. 6($b$) shows Tafel plots.

[Three-Electrode Cell]:
Working electrode: catalyst-coated GC
Reference electrode: reversible hydrogen electrode (RHE)
Counter electrode: Pt mesh
Electrolyte: 0.1 mol/L KOH aqueous solution As shown in FIG. 6($a$), the oxygen evolution potential lowered with the decrease in x (Li), and the anode in which x=0 exhibited the highest performance. In addition, as shown in FIG. 6($b$), the Tafel slope changed from about 98 mVdec$^{-1}$ to about 66 mVdec$^{-1}$ with the decrease in x (Li). It is presumed that the change in the Tafel slope strengthens the adsorption of an OH intermediate caused depending on the state of the covalent bond of Ni species. That is, the improvement in the oxygen evolution ability of the catalyst is presumed to be due to a change in the reaction path rather than an increase in the reaction rate which is the rate-determining step.

<Production of Anode>

Example 1

A nickel expanded mesh (10 cm×10 cm, LW×3.7 SW×0.9 ST×0.8 T) on which a chemical etching treatment was performed by immersing the nickel expanded mesh for 6 minutes in 17.5% hydrochloric acid heated to near the boiling point was prepared as an anode substrate. This expanded mesh was subjected to a blast treatment (0.3 MPa) with alumina particles of 60 mesh, and was then immersed for 6 minutes in 20% hydrochloric acid heated to near the boiling point to perform a chemical etching treatment. An aqueous solution containing components to be a precursor of a lithium-containing nickel oxide was coated, with a brush, on the surface of the anode substrate after the chemical etching treatment, and was then dried at 80° C. for 15 minutes. Subsequently, the anode substrate was subjected to a thermal treatment at 600° C. for 15 minutes in an oxygen atmosphere. The treatments from the coating of the aqueous solution to the thermal treatment were repeated 20 times to obtain an intermediate having an intermediate layer (composition: Li$_{0.5}$Ni$_{1.5}$O$_2$) formed on the surface of the anode substrate.

Next, an anode having a catalyst layer (composition: Li$_{0.00}$Ni$_{0.49}$Mn$_{1.51}$O$_4$) formed on the surface of the intermediate layer was obtained by the same method as in Production Example 1 described above using the catalyst ink of the nickel-containing metal oxide (catalyst) (x=0.00) obtained according to condition 5 in Production Example 1.

A small-sized zero-gap type electrolytic cell using a neutral separator was prepared using: the obtained anode; a separator (trade name "Zirfon" manufactured by AGFA-Gevaert NV); and an active cathode having a catalyst layer containing Ru and Pr oxide and formed thereon. The area of the electrodes was set to 19 cm$^2$. An electrolyte (25% KOH aqueous solution) was supplied to the anode chamber and the cathode chamber forming the electrolytic cell to perform electrolysis at a current density of 6 kA/m$^2$ for 6 hours in each chamber. The overpotential on that occasion was 250 mV. Subsequently, the anode and the cathode were brought into a short-circuit state (0 kA/m$^2$) to shut down the electrolysis for 15 hours. Shutdown tests in which the operation from the electrolysis to the shutdown was defined as 1 cycle were conducted. As a result, it was ascertained that the voltage was kept stable in the shutdown tests of 15 times.

Example 2

A coating solution having a total metal concentration of 75 g/L was prepared by dissolving $LiNO_3$, $Ni(NO_3)_2 \cdot 6H_2O$, and $Mn(NO_3)_2 \cdot 6H_2O$ in ultrapure water. The molar ratio of the metals in the coating solution was Li:Ni:Mn=0.33:0.17: 0.5. The coating solution was coated on a substrate on which the same intermediate layer as in Example 1 had been formed, thereafter dried at 60° C., subsequently calcined in an electric oven set at 500° C. for 15 minutes, and then cooled. The operation from the coating of the coating solution to the cooling was repeated 10 times to form a catalyst layer containing about 10 g/m² of a metal oxide. Subsequently, the substrate having the catalyst layer formed thereon was subjected to a thermal treatment (post-bake) at 500° C. for 1 hour, 3 hours, and 10 hours in the air. In a PTFE container filled with a solution obtained by dissolving an excessive amount of nitronium tetrafluoroborate ($NO_2BF_4$) in acetonitrile, the substrate having the catalyst layer formed thereon was placed to perform a delithiation reaction under stirring at room temperature for 70 hours. The substrate was washed with acetonitrile three times and then dried, and thus electrodes (composition of catalyst layer: $Li_{0.00}Ni_{0.50}Mn_{1.50}O_4$) in which the Li component in the LNMO catalyst had been almost removed were obtained. The obtained electrodes were each used as a working electrode and a Pt mesh was used as a counter electrode to conduct current-potential measurement during oxygen evolution in a 7 mol/L KOH aqueous solution at 60° C. FIG. 7 shows the results (after delithiation). As shown in FIG. 7, each electrode showed a low potential of about 1.6 V vs. RHE at 0.5 A/cm². In addition, the electrodes with shorter post-bake time showed lower potentials. Further, FIG. 8 shows potential changes (after delithiation) when the electrolysis at 1 A/cm² for 60 minutes was continued. As shown in FIG. 8, the potential of the electrode for which the post-bake was performed for 1 hour was initially 1.75 V but gradually lowered to 1.65 V.

Comparative Example 1

Electrodes each having a catalyst (LNMO catalyst) layer were obtained in the same manner as in Example 2 described above except that the delithiation reaction was not performed. FIG. 7 shows results (before delithiation) of current-potential measurement during oxygen evolution for the obtained electrodes. As shown in FIG. 7, each electrode showed a high potential of about 1.8 V vs. RHE at 0.5 A/cm². In addition, FIG. 8 shows potential changes (before delithiation) when the electrolysis at 1 A/cm² for 60 minutes was continued. As shown in FIG. 8, the potential of the electrode for which the post-bake was performed for 1 hour was initially 2.05 V, and increased once to 2.1 V and then gradually lowered to 2.05 V. It is found that the performance of the electrodes of Example 2 was improved by about 0.4 V as compared to the electrodes of Comparative Example 1. In addition, from the fact that the Tafel slopes of the electrodes of Example 2 were significantly smaller than the Tafel slopes of the electrodes of Comparative Example 1, it is found that the catalytic activity to reaction was improved by the delithiation.

INDUSTRIAL APPLICABILITY

The alkaline water electrolysis anode of the present invention is suitable as, for example, an alkaline water electrolysis anode that forms electrolysis equipment or the like in which electric power having a large output fluctuation, such as renewable energy, is used as a power source.

REFERENCE SIGNS LIST

2 Electrically conductive substrate
4 Intermediate layer
6 Catalyst layer
10 Alkaline water electrolysis anode

The invention claimed is:
1. An alkaline water electrolysis anode comprising:
an electrically conductive substrate at least a surface of which comprises nickel or a nickel base alloy;
an intermediate layer on the electrically conductive substrate; and
a catalyst layer disposed on a surface of the intermediate layer, the catalyst layer comprising a nickel-containing metal oxide having a spinel structure,
wherein the intermediate layer disposed between the electrically conductive substrate and the catalyst layer comprises a lithium-containing nickel oxide represented by compositional formula $Li_xNi_{2-x}O_2$ wherein x is in a range of $0.02 \leq x \leq 0.5$, and
the nickel-containing metal oxide comprises nickel (Ni) and manganese (Mn), and has an atom ratio of Li/Ni/Mn/O in a range of (0.0 to 0.8)/(0.4 to 0.6)/(1.0 to 1.8)/4.0.

2. The alkaline water electrolysis anode according to claim 1, wherein a proportion of manganese (Mn) having a valence of four in all the manganese (Mn) in the nickel-containing metal oxide is in a range of 99 mol % or more.

3. A method for producing an alkaline water electrolysis anode, comprising:
subjecting an electrically conductive substrate having a surface coated with an aqueous solution comprising a lithium ion and a nickel ion to a first thermal treatment so as to form an intermediate layer on the surface of the electrically conductive substrate, the intermediate layer comprising a lithium-containing nickel oxide represented by compositional formula $Li_xNi_{2-x}O_2$ wherein x is in a range of $0.02 \leq x \leq 0.5$, and at least the surface of the electrically conductive substrate comprising nickel or a nickel base alloy;
subjecting a precursor comprising a lithium component, a nickel component, and a manganese component to a second thermal treatment so as to form a layer comprising a lithium composite oxide on a surface of the intermediate layer; and
reacting nitronium tetrafluoroborate ($NO_2BF_4$) with the lithium composite oxide, thereby chemically performing delithiation, so as to form, on the surface of the intermediate layer, a catalyst layer comprising a nickel-containing metal oxide having a controlled lithium content and having a spinel structure, wherein
the nickel-containing metal oxide comprises nickel (Ni) and manganese (Mn), and has an atom ratio of Li/Ni/Mn/O in a range of (0.0 to 0.8)/(0.4 to 0.6)/(1.0 to 1.8)/4.0.

4. The method for producing an alkaline water electrolysis anode according to claim 3, wherein the precursor is subjected to the second thermal treatment at a temperature in a range from 400° C. to 900° C. in an oxygen-containing atmosphere.

5. The method for producing an alkaline water electrolysis anode according to claim 3, wherein the precursor is subjected to the second thermal treatment in an oxygen-containing atmosphere having an oxygen partial pressure in a range of 0.2 atm or higher.

* * * * *